United States Patent
Agrawal

(10) Patent No.: US 11,994,589 B2
(45) Date of Patent: May 28, 2024

(54) VAPOR DETECTION IN LIDAR POINT CLOUD

(71) Applicant: GM Cruise Holdings LLC, San Francisco, CA (US)

(72) Inventor: Pranay Agrawal, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 575 days.

(21) Appl. No.: 16/835,226

(22) Filed: Mar. 30, 2020

(65) Prior Publication Data

US 2021/0302583 A1    Sep. 30, 2021

(51) Int. Cl.
*G01S 17/89* (2020.01)
*G01S 7/481* (2006.01)
*G01S 7/497* (2006.01)
*G01S 17/931* (2020.01)

(52) U.S. Cl.
CPC .............. *G01S 17/89* (2013.01); *G01S 7/481* (2013.01); *G01S 7/497* (2013.01); *G01S 17/931* (2020.01)

(58) Field of Classification Search
CPC .......... G01S 7/481; G01S 7/497; G01S 17/89; G01S 17/931
See application file for complete search history.

(56) References Cited

U.S. PATENT DOCUMENTS

| 2014/0330479 | A1* | 11/2014 | Dolgov | G01S 13/865 |
| | | | | 701/28 |
| 2019/0317217 | A1* | 10/2019 | Day | G01S 17/58 |
| 2020/0088851 | A1* | 3/2020 | Hall | G01S 17/10 |
| 2020/0309957 | A1* | 10/2020 | Bhaskaran | G01S 17/86 |
| 2022/0415059 | A1* | 12/2022 | Smolyanskiy | B60W 60/0016 |

OTHER PUBLICATIONS

Bijelic et al. ("Seeing through fog without seeing fog: Deep sensor fusion in the absence of labeled training data"—2019 (Year: 2019).*
Scribd. ((n.d.). 63-9276 rev C VLP-16 application note—packet structure timing definition) (Year: 2019).*

(Continued)

*Primary Examiner* — Bernarr E Gregory
*Assistant Examiner* — Hailey R Le
(74) *Attorney, Agent, or Firm* — Michael DiCato

(57) ABSTRACT

Various technologies described herein pertain to detecting data in a lidar point cloud representative of vapor and controlling an autonomous vehicle based on such detection. The lidar point cloud is outputted by a lidar sensor system of the autonomous vehicle. The techniques set forth herein utilize dual return lidar data outputted by the lidar sensor system. The dual return lidar data includes two lidar returns received responsive to a light beam emitted (e.g., at a particular azimuthal angle) by the lidar sensor system into a driving environment of the autonomous vehicle. The data in the lidar point cloud detected as being caused by vapor can be removed from downstream processing; accordingly, the autonomous vehicle can be controlled such that the autonomous vehicle need not stop for or maneuver around vapor in the driving environment.

20 Claims, 9 Drawing Sheets

(56) References Cited

OTHER PUBLICATIONS

Velodyne. (Feb. 12, 2018). (VLP-32C User Manual. https://icave2.cse.buffalo.edu/resources/sensor-modeling/VLP32CManual.pdf) (Year: 2018).*
Scribd. (63-9276 rev C VLP-16 application note—packet structure timing definition) (Year: 2019).*
Feng et al (2019. Deep Active Learning for Efficient Training of a LiDAR 3D Object Detector. In 2019 IEEE Intelligent Vehicles Symposium (IV). IEEE Press, 667-674) (Year: 2019).*
Bijelic et al. ("Seeing through fog without seeing fog: Deep sensor fusion in the absence of labeled training data") (Year: 2019).*

* cited by examiner

VAPOR DETECTION IN LIDAR POINT CLOUD

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals outputted by the sensor systems.

The sensor systems of the autonomous vehicle can be utilized to detect various objects nearby the autonomous vehicle in a driving environment of the autonomous vehicle. For instance, the sensor systems can be employed to detect objects such as vehicles, pedestrians, road surfaces, bikes, trees, and other static objects (e.g., buildings, telephone poles, etc.). Accordingly, operation of the autonomous vehicle can be controlled based on the detected objects nearby the autonomous vehicle.

Using typical approaches, various scenarios can lead to a sensor system outputting data that causes an autonomous vehicle to improperly detect presence of an object at a particular location in the driving environment. For instance, vapor (e.g., steam, fog, smoke, exhaust, mist) may be transparent or partially transparent in radar data outputted by a radar sensor system or a camera image outputted by a camera sensor system. In contrast, vapor oftentimes is opaque in lidar data outputted by a lidar sensor system of the autonomous vehicle. Vapor can reflect a light beam emitted by the lidar sensor system, which can result in a lidar return having a relatively high intensity corresponding to a location of the vapor. Accordingly, when employing conventional approaches, the autonomous vehicle may detect the presence of an object at the location of the vapor; however, the autonomous vehicle may be unable to identify that such object is vapor. Instead, the autonomous vehicle may be controlled to avoid the vapor. For example, the autonomous vehicle may be controlled to stop before reaching the location of the vapor (e.g., such stopping may be a hard braking event where the autonomous vehicle decelerates relatively quickly depending on the distance between the autonomous vehicle and the location of the vapor). Moreover, the autonomous vehicle may remain stopped due to the presence of the vapor being detected based on the lidar data without being able to identify that the autonomous vehicle should instead drive through the vapor.

According to an illustration, while traveling through a city, an autonomous vehicle may approach steam rising from a vent on a road. A lidar sensor system of the autonomous vehicle can output lidar data that includes lidar returns corresponding to locations of the steam. However, using traditional approaches, the autonomous vehicle may be unable to differentiate points in a lidar point cloud that are from steam versus points in the lidar point cloud that are from other objects (e.g., vehicles, pedestrians, road surfaces, bikes, trees, other static objects). Thus, employing conventional perception approaches based on the lidar data, the autonomous vehicle is typically unable to discern whether to drive through the steam, which can lead to the autonomous vehicle stopping before reaching the location of the steam (and remaining stopped at such location, potentially for an extended period of time and potentially leading to human operator takeover of control of operation of the autonomous vehicle).

SUMMARY

The following is a brief summary of subject matter that is described in greater detail herein. This summary is not intended to be limiting as to the scope of the claims.

Described herein are various technologies that pertain to detecting data in a lidar point cloud representative of vapor, where the lidar point cloud is outputted by a lidar sensor system of an autonomous vehicle, and controlling the autonomous vehicle based on such detection. The techniques set forth herein utilize dual return lidar data outputted by the lidar sensor system. The dual return lidar data includes two lidar returns received responsive to a light beam emitted (e.g., at a particular azimuthal angle) by the lidar sensor system into a driving environment of the autonomous vehicle. The two lidar returns can include a strongest lidar return and a farthest lidar return received responsive to the light beam. The data in the lidar point cloud detected as being caused by vapor can be removed from downstream processing; accordingly, the autonomous vehicle can be controlled such that the autonomous vehicle need not stop for or maneuver around vapor in the driving environment.

According to various embodiments, the autonomous vehicle can assign a label to an object captured in the dual return lidar data. The label can identify a type of the object captured in the dual return lidar data. The label can be assigned based upon a probability determined for the type of the object from amongst a predefined set of types. The predefined set of types includes vapor. The vapor object type can represent steam, fog, smoke, exhaust, mist, or other types of vapor in the driving environment. The predefined set of types can additionally include vehicles, pedestrians, road surfaces, bikes, trees, and static objects; however, it is contemplated that other types can additionally or alternatively be included in the predefined set of types. The probability can be determined for the type of the object based on the dual return lidar data. Moreover, a vehicle propulsion system, a braking system, and/or a steering system of the autonomous vehicle can be controlled based on the label assigned to the object. The vehicle propulsion system, the braking system, and the steering system can be controlled such that the object is ignored when the object is assigned the label of vapor. Accordingly, in contrast to conventional techniques, the approaches set forth herein can mitigate false object detection caused by vapor in the driving environment of the autonomous vehicle.

Pursuant to various embodiments, probabilities of an object at a position in the driving environment respectively being each of the various predefined types of objects can be determined. For instance, a feature vector can be generated based upon the dual return lidar data. The feature vector can include an identifier of the light beam, an identifier of an azimuthal angle of the light beam, a first range value of a strongest lidar return received responsive to the light beam at the azimuthal angle, a second range value of a farthest lidar return received responsive to the light beam at the azimuthal angle, a first intensity value of the strongest lidar return, and a second intensity value of the farthest lidar return. The feature vector can be inputted to a neural network, and the probabilities of the object respectively being each of the various predefined types of objects can be outputted by the neural network responsive to the feature vector being inputted to the neural network.

In accordance with various embodiments, vapor map data indicating likely presence of vapor at a particular geographic location can further be used to detect data in the lidar point cloud caused by vapor. For example, the vapor map data can be included as part of the feature vector inputted to the neural network. Additionally or alternatively, the vapor map data can be used to modify the probabilities outputted by the neural network.

Moreover, according to various embodiments, data outputted by a differing sensor system (e.g., a camera sensor system, a radar sensor system) can be used to detect data in the lidar point cloud caused by vapor. For instance, haze can be detected in a camera image generated by a camera sensor system; presence or absence of haze in the camera image can be used to detect data in the lidar point cloud caused by vapor. According to another example, the dual return lidar data can be projected onto data outputted by the differing sensor system to determine whether lidar returns as projected correspond to the data outputted by the differing sensor system; again, the foregoing can be used to detect data in the lidar point cloud caused by vapor.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
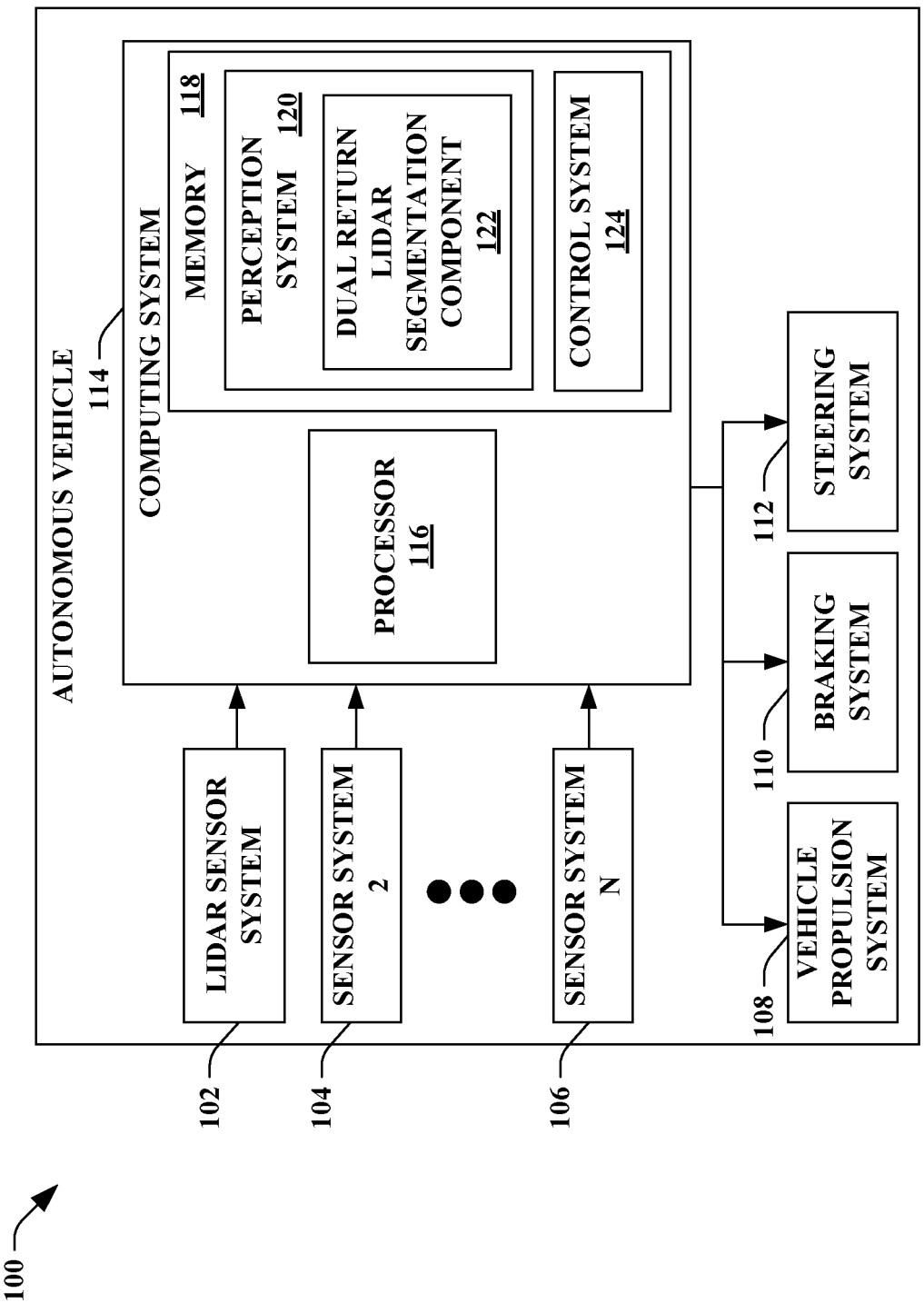
FIG. 1 illustrates a functional block diagram of an exemplary autonomous vehicle.

Various technologies pertaining to detecting data in a lidar point cloud representative of vapor, where the lidar point cloud is outputted by a lidar sensor system of an autonomous vehicle, and controlling the autonomous vehicle based upon such detection of the data representative of vapor are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Referring now to the drawings, FIG. 1 illustrates an exemplary autonomous vehicle 100. The autonomous vehicle 100 can navigate about roadways without human conduction based upon sensor signals outputted by sensor systems of the autonomous vehicle 100. The autonomous vehicle 100 includes a lidar sensor system 102 and a plurality of additional sensor systems 104-106 (namely, a sensor system 2 104, . . . , and a sensor system N 106, where N can be substantially any integer greater than 1). The sensor systems 104-106 may be of different types. For example, the sensor system 2 104 may be a radar sensor system and the sensor system N 106 may be a camera (image) system. Other exemplary sensor systems included in the sensor systems 104-106 can include GPS sensor systems, sonar sensor systems, infrared sensor systems, and the like. Moreover, the various sensor systems 102-106 are arranged about the autonomous vehicle 100.

The autonomous vehicle 100 further includes several mechanical systems that are used to effectuate appropriate motion of the autonomous vehicle 100. For instance, the mechanical systems can include, but are not limited to, a vehicle propulsion system 108, a braking system 110, and a steering system 112. The vehicle propulsion system 108 may be an electric engine, an internal combustion engine, or a combination thereof. The braking system 110 can include an engine brake, brake pads, actuators, a regenerative braking system, and/or any other suitable componentry that is configured to assist in decelerating the autonomous vehicle 100. The steering system 112 includes suitable componentry that is configured to control the direction of movement of the autonomous vehicle 100.

The autonomous vehicle 100 additionally includes a computing system 114 that is in communication with the sensor systems 102-106 and is further in communication with the vehicle propulsion system 108, the braking system 110, and the steering system 112. The computing system 114 includes a processor 116 and memory 118 that includes computer-executable instructions that are executed by the processor 116. Pursuant to various examples, the processor 116 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 118 comprises a perception system 120 that is configured to identify objects (in proximity to the autonomous vehicle 100) captured in sensor signals outputted by the sensor systems 102-106. The perception system 120 includes a dual return lidar segmentation component 122 configured to determine a type of an object at a position in a driving environment based upon lidar data outputted by the lidar sensor system 102. More particularly, the lidar sensor system 102 can output dual return lidar data that includes two lidar returns detected responsive to a light beam emitted by the lidar sensor system 102 into the driving environment of the autonomous vehicle 100 (e.g., when the light beam is emitted into the driving environment at a particular azimuthal angle during a particular time period). The dual return lidar data outputted by the lidar sensor system 102 can include two lidar returns per light beam emitted by the lidar sensor system 102 at each azimuthal angle into the driving environment of the autonomous vehicle 100. The two lidar returns outputted by the lidar sensor system 102 responsive to an emitted light beam can include a strongest lidar return and a farthest lidar return. Accordingly, the two lidar returns detected responsive to a light beam can include a first range value and a first intensity value of a strongest lidar return received responsive to the light beam and a second range value and a second intensity value of a farthest lidar return received responsive to the light beam. The first range value (of the strongest lidar return) and the second range value (of the farthest lidar return) can be distances from the lidar sensor system 102 along a line of sight of the emitted light beam respectively corresponding to a point at which a strongest reflection of the light beam occurs and a point farthest from the lidar sensor system 102 that reflects the light beam. It is contemplated that the strongest lidar return and the farthest lidar return can be the same return in various scenarios (e.g., the first and second range values can be the same or substantially similar and the first and second intensity values can be the same or substantially similar in the absence of vapor in the driving environment reflecting an emitted light beam), while the strongest lidar return and the farthest lidar return can differ in other scenarios (e.g., the first and second range values can differ due to an emitted light beam being partially reflected by vapor in the driving environment).

The dual return lidar segmentation component 122 can receive the dual return lidar data outputted by the lidar sensor system 102. Further, based on the dual return lidar data, the dual return lidar segmentation component 122 can determine probabilities of the object at the position in the driving environment respectively being various predefined types of objects. For instance, the dual return lidar segmentation component 122 can determine probabilities of the object at a position corresponding to the first range value of the strongest lidar return being each of the predefined types of objects based on the first range value and the first intensity value of the strongest lidar return and the second range value and the second intensity value of the farthest lidar return.

The predefined types of objects include vapor. The vapor object type can represent steam, fog, smoke, exhaust, mist, or other types of vapor in the driving environment. Moreover, the predefined types of objects can include, but are not limited to vehicles, pedestrians, road surfaces, bikes, trees, and static objects. The static object type can represent objects that are usually not in motion such as telephone poles, buildings, construction equipment, etc.

The perception system 120 can assign a label to an object at a position in the driving environment. The label can identify the type of the object at the position. The perception system 120 can assign the label based upon the probabilities of the object at the position in the driving environment respectively being the various predefined types of objects as determined by the dual return lidar segmentation component 122. Thus, the perception system 120 can identify whether the dual return lidar data outputted by the lidar sensor system 102 includes lidar returns corresponding to vapor in the driving environment. For instance, lidar returns identified as corresponding to vapor in the driving environment can be ignored (e.g., the autonomous vehicle 100 need not stop due to vapor detected in the driving environment, the autonomous vehicle 100 need not maneuver around vapor detected in the driving environment).

As will be described in greater detail below, the perception system 120 can further include various additional components that are configured to output data indicative of positions and/or predefined types of objects in the driving environment of the autonomous vehicle 100. Thus, these additional components can be used in conjunction with the dual return lidar segmentation component 122 to assign a label to an object at a position in the driving environment of the autonomous vehicle 100.

The memory 118 additionally includes a control system 124. The control system 124 is configured to receive output of the perception system 120, and is further configured to control at least one of the mechanical systems of the autonomous vehicle 100 (e.g., at least one of the vehicle propulsion system 108, the braking system 110, and/or the steering system 112) based on the output of the perception system 120. For example, the control system 124 can control at least one of the mechanical systems based on a label assigned to an object at a position in the driving environment. According to an illustration, the control system 124 can control the mechanical systems to cause the autonomous vehicle 100 to drive through vapor in the driving environment.

In contrast to the approaches set forth herein using the dual return lidar data, other approaches that determine a type of object at a position in an environment based on lidar data commonly may be unable to distinguish vapor from other types of objects. Oftentimes, a strongest lidar return may be caused by vapor in the driving environment. Thus, while vapor may be transparent or partially transparent in radar data outputted by a radar sensor system or a camera image outputted by a camera sensor system (and it is desirable for the autonomous vehicle to drive through the vapor), the vapor can be opaque in the lidar data, particularly if the strongest lidar return is used without also using a farthest lidar return. Accordingly, conventional approaches that use single return lidar data (e.g., the strongest lidar return) as opposed to dual return lidar data can lead to false object detection in perception. Such false object detection can cause the autonomous vehicle to be controlled to avoid the vapor, for example, by stopping before reaching the location of the vapor, remaining stopped due to the presence of the vapor, maneuvering around the location of the vapor, or the like.

While the techniques described herein pertain to detecting vapor, it is contemplated that these techniques can similarly be employed to remove noise caused by retroreflective objects or solar noise in the driving environment.

Figure 2:
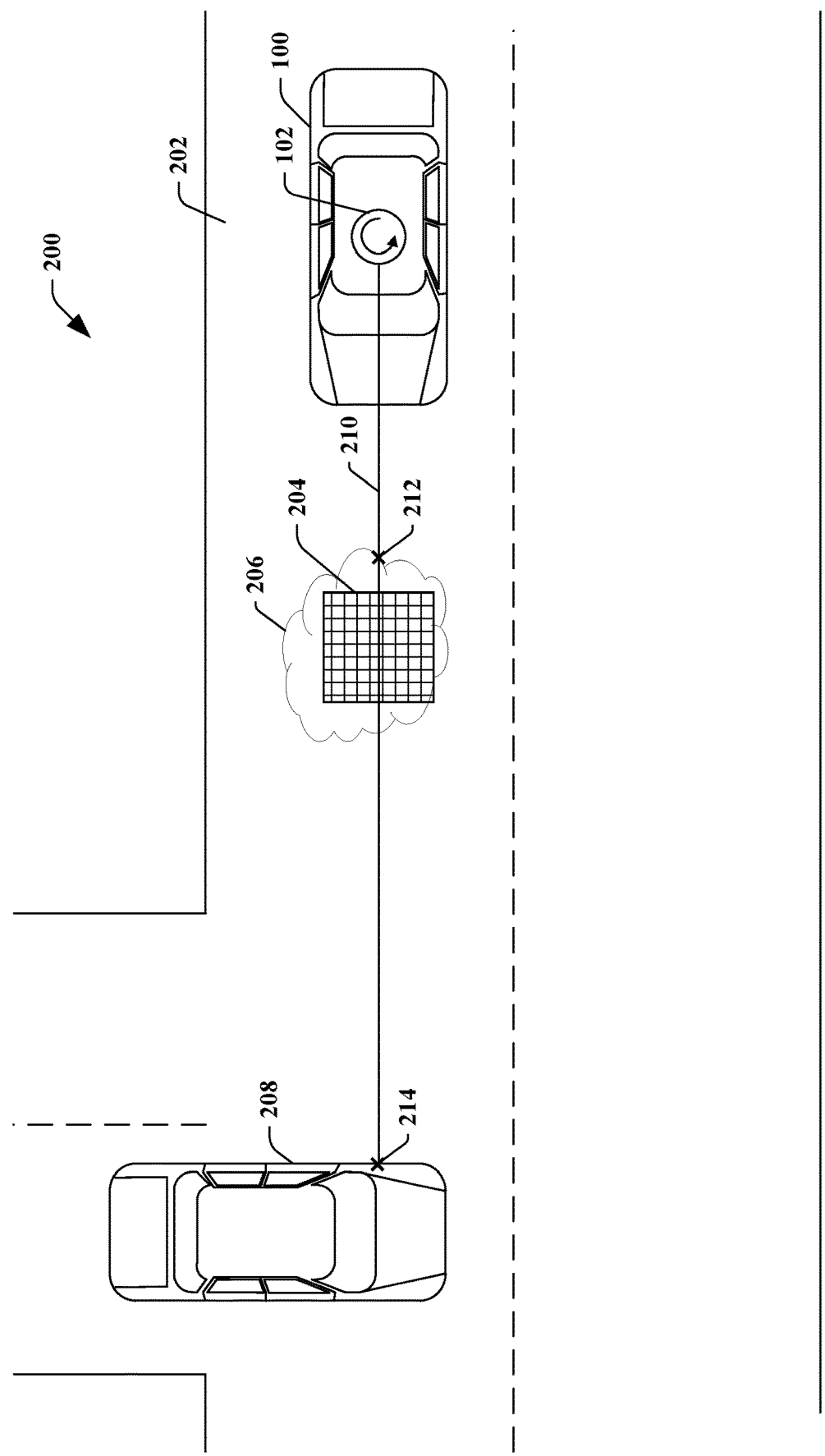
FIG. 2 illustrates a top view of an exemplary driving environment of the autonomous vehicle of FIG. 1.

Now referring to FIG. 2, illustrated is a top view of an exemplary driving environment 200 of the autonomous vehicle 100. The autonomous vehicle 100 is traveling along a roadway 202. A grate 204 is located on the roadway 202, and steam 206 is rising from the grate 204. A second vehicle 208 is located beyond the steam 206 (and beyond the grate 204) from the perspective of the autonomous vehicle 100.

Exemplary operation of the autonomous vehicle 100 in the driving environment 200 in connection with generating dual return lidar data is now set forth. The lidar sensor system 102 of the autonomous vehicle 100 emits a light beam 210 into the driving environment 200. The lidar sensor system 102 can have a 360 degree azimuthal field of view or an azimuthal field of view of less than 360 degrees (e.g., the autonomous vehicle 100 can include more than one lidar sensor system to provide a field of view of 360 degrees about the autonomous vehicle 100). Thus, the light beam 210 can be scanned 360 degrees around the autonomous vehicle 100 or within an arc of less than 360 degrees about the autonomous vehicle 100. The emitted light beam 210 can impinge upon various objects (e.g., the roadway 202, the grate 204, the steam 206, the second vehicle 208, other object(s)) in the driving environment 200. The lidar sensor system 102 receives reflections of the light beam 210, and based upon such reflections outputs data indicative of positions of a plurality of points of intersection of the light beam 210 with the objects in the driving environment 200. More particularly, when the light beam 210 is oriented at a particular azimuthal angle during the scan about the autonomous vehicle 100, the lidar sensor system 102 can output data indicative of a strongest lidar return and a farthest lidar return. The lidar sensor system 102 can output data indicative of respective strongest lidar returns and farthest lidar return for the light beam 210 when emitted at various azimuthal angles in the field of view about the autonomous vehicle 100.

According to an example, when the light beam 210 is emitted into the driving environment 200 from the lidar sensor system 102 at the azimuthal angle depicted in the FIG. 2 (along the depicted line of sight), a portion of the light beam 210 can be reflected by the steam 206 at point 212 and another portion of the light beam 210 can be reflected by the second vehicle 208 at point 214 (e.g., the light beam 210 is not completely reflected by the steam 206). The lidar sensor system 102 can detect a strongest lidar return based on the portion of the light beam 210 reflected by the steam 206 at point 212 and a farthest lidar return based on the portion of the light beam 210 reflected by the second vehicle 208 at point 214. Accordingly, the lidar sensor system 102 can output dual return lidar data that includes data indicating three-dimensional positions of the point 212 and the point 214 when the light beam 210 is emitted into the driving environment 200 from the lidar sensor system 102 at the depicted azimuthal angle. The data indicating the three-dimensional positions can be relative to the autonomous vehicle 100, relative to a point of reference in the driving environment 200 or outside of the driving environment 200, or the like. Moreover, the dual return lidar data can include intensity values of the reflected light beam 210 corresponding to the point 212 and the point 214.

Figure 3:
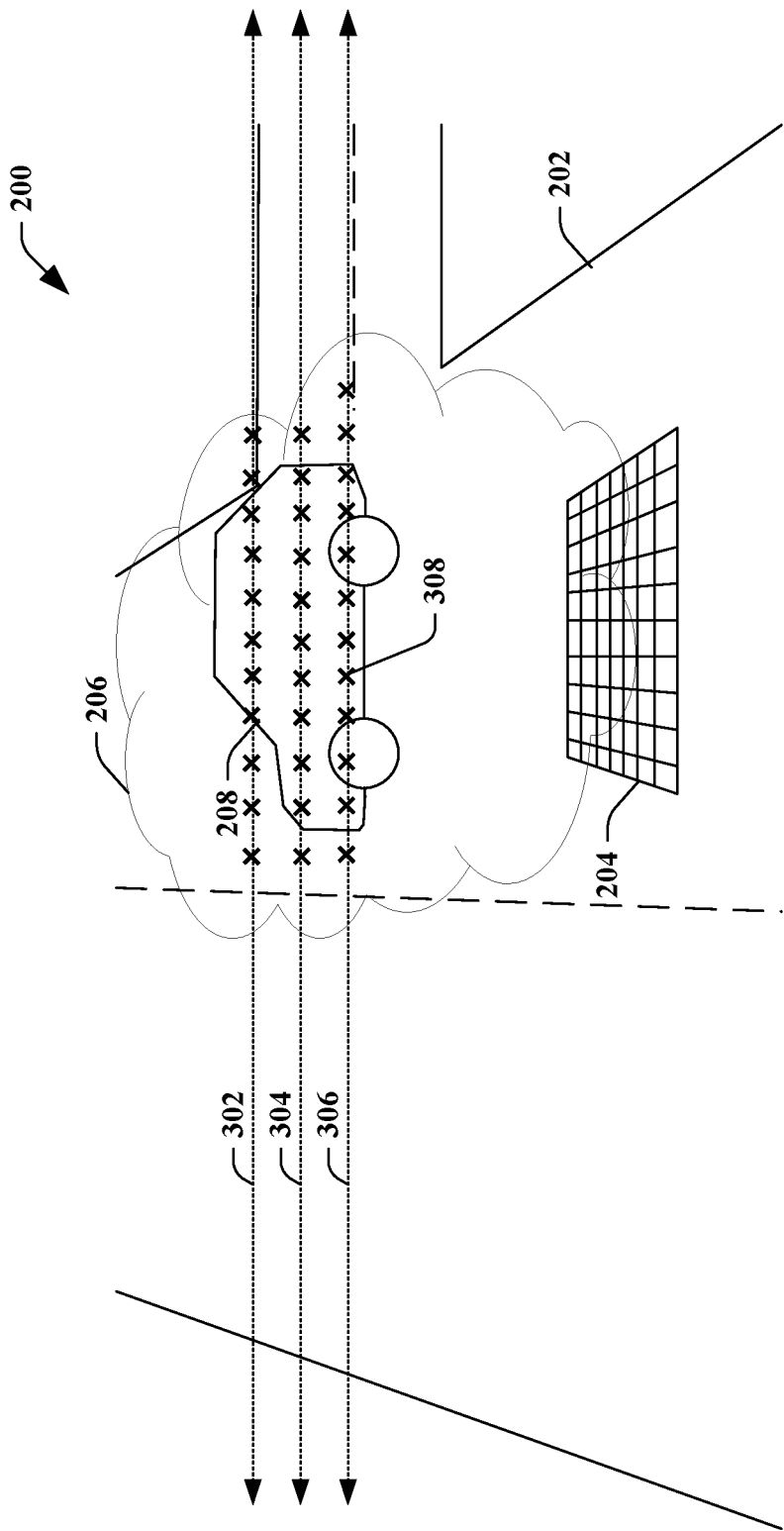
FIG. 3 illustrates a head-on view of the driving environment of FIG. 2 from a perspective of the autonomous vehicle.

While FIG. 2 depicts the light beam 210 oriented at a particular azimuthal angle, as noted above, it is contemplated that the lidar sensor system 102 can scan the light beam across the azimuthal field of view (e.g., 360 degrees about the autonomous vehicle 100, within an arc less than 360 degrees about the autonomous vehicle). Moreover, it is to be understood that while a single light beam 210 is shown in FIG. 2, the lidar sensor system 102 can emit a plurality of light beams into the driving environment 200. For example, FIG. 3 illustrates a head-on view of the driving environment 200 of FIG. 2 from a perspective of the autonomous vehicle 100. The lidar sensor system 102 emits a plurality of light beams into the driving environment 200, where each of the light beams has a different angular alignment with respect to a horizontal reference plane of the autonomous vehicle 100. Each of a plurality of sensors in the lidar sensor system 102 may be aligned with a different respective light beam emitted by the lidar sensor system 102, such that the lidar sensor system 102 outputs data indicative of a plurality of points of intersection for each of the plurality of light beams over a period of time. As shown in FIG. 3, the plurality of light beams scan across the objects in the driving environment 200 at various azimuthal angles (e.g., azimuthal bins) and intersect objects along scan lines 302-306. While three scan lines 302-306 are depicted, it is contemplated that the lidar sensor system 102 can emit light beams that are scanned across substantially any number of scan lines. Each of the points where a light beam emitted by the lidar sensor system 102 intersects an object in the driving environment 200 lies along one of the scan lines 302-306. Hence, each of the plurality of lidar sensors in the lidar sensor system 102 outputs data indicative of points of intersection of a respective light beam with various objects in the driving environment 200 along a respective scan line 302-306. A lidar point cloud output by the lidar sensor system 102 can therefore be considered a rastered image of objects and surfaces in the driving environment 200. Moreover, for each light beam at each azimuthal angle (e.g., azimuthal bin), the lidar sensor system 102 can output dual return lidar data (e.g., the lidar point cloud) that includes two lidar returns (e.g., the strongest lidar return and the farther lidar return).

It is to be appreciated that over the period of a scan of the driving environment 200 of the autonomous vehicle 100 by the lidar sensor system 102, the lidar sensor system 102 can output data indicative of positions of a larger number of points than are depicted in FIGS. 2 and 3 (e.g., tens of thousands of points, hundreds of thousands of points, millions of points, etc.). Further, it is to be appreciated that the lidar sensor system 102 can include a greater number of light beams and sensors than depicted in either of FIG. 2 or 3. By way of example, the lidar sensor system 102 can include at least 64 light beams and corresponding sensors, at least 128 light beams and corresponding sensors, or at least 256 light beams and corresponding sensors.

Figure 4:
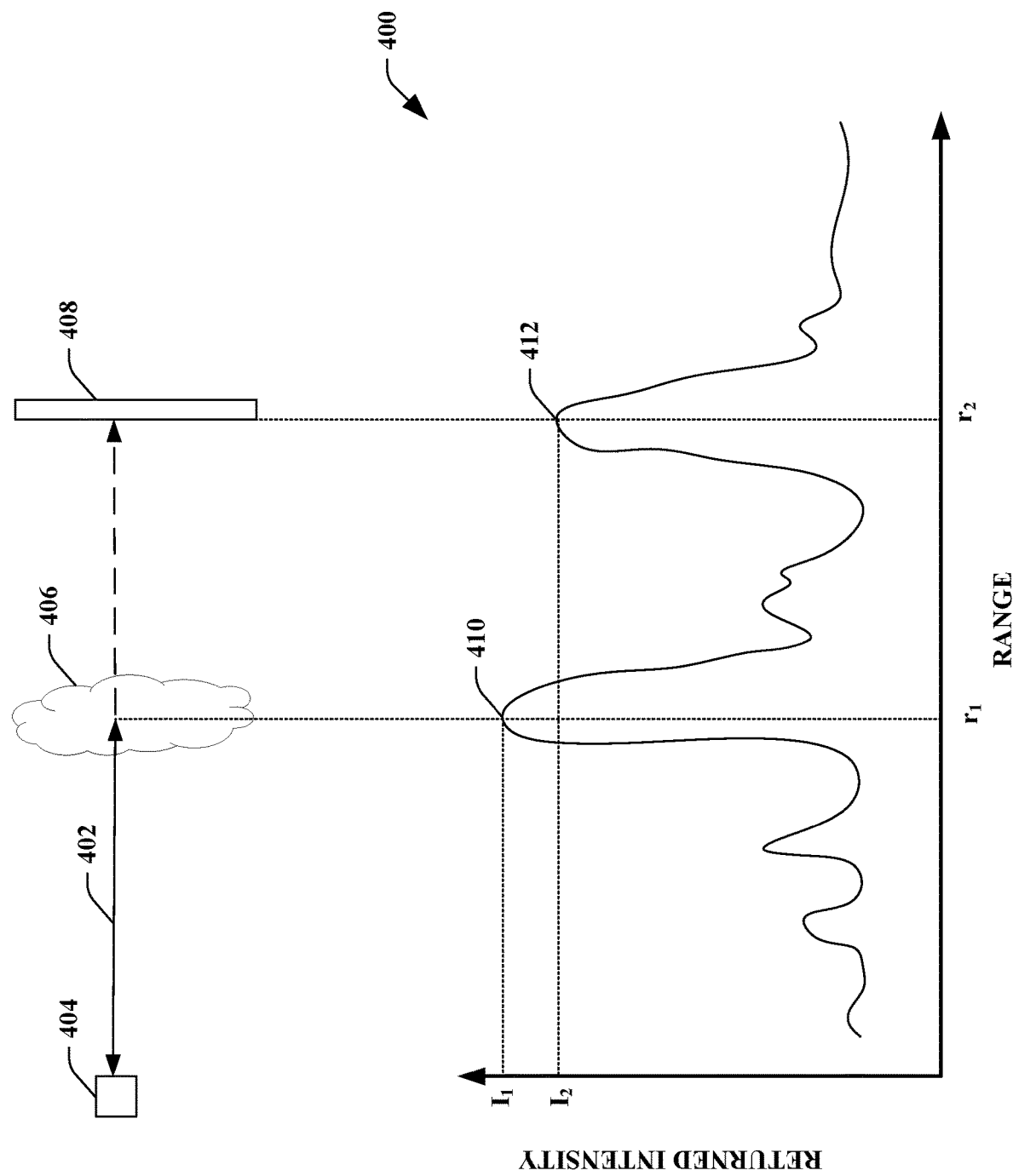
FIG. 4 illustrates an exemplary graph showing returned intensity of a reflected light beam versus range for a light beam emitted from a lidar sensor system.

Now turning to FIG. 4, illustrated is an exemplary graph 400 showing returned intensity of a reflected light beam versus range for a light beam 402 emitted from a lidar sensor system 404 (e.g., the lidar sensor system 102). The range is a distance between an object that reflects at least a portion of the light beam 402 and the lidar sensor system 400. In the example of FIG. 4, the light beam 402 is partially reflected by vapor 406 and partially reflected by a differing object 408, such as a vehicle, a pedestrian, a bike, a tree, a static object (e.g., a wall, a building, etc.), or the like. The differing object 408 is positioned at a farther distance from the lidar sensor system 404 as compared to the vapor 406.

Reflection of a portion of the light beam 402 by the vapor 406 can cause the lidar sensor system 404 to detect a strongest lidar return at a maximum intensity peak 410, and reflection of a portion of the light beam 402 by the differing object 408 can cause the lidar sensor system 404 to detect a farthest lidar return at a farthest range peak 412. The maximum intensity peak 410 can be an overall maximum returned intensity value ($I_1$) detected by the lidar sensor system 404. As shown, the maximum intensity peak 410 has a range value $r_1$, which is a distance between the lidar sensor system 404 and a point in the vapor 406 (which reflects a portion of the light beam 402). Moreover, the farthest range peak 412 can be a local maximum returned intensity value ($I_2$) over a threshold value at a farthest range detected by the lidar sensor system 404. The threshold value can be used to mitigate detection of noise (e.g., a local maximum returned intensity value below the threshold value at a range farther than $r_2$ can be treated as noise). In the example illustrated, the farthest range peak 412 has a range value $r_2$, which is a distance between the lidar sensor system 404 and a point on the differing object 408 (which reflects a portion of the light beam 402). The farthest range peak 412 can identify the farthest point detected from the lidar sensor system 404 based on the reflected light beam received at the lidar sensor system 404.

As described herein, the dual return lidar data outputted by the lidar sensor system 404 includes a strongest lidar return and a farthest lidar return received responsive to an emitted light beam. For the depicted example of FIG. 4, the strongest lidar return outputted by the lidar sensor system 404 includes a first range value ($r_1$) and a first intensity value ($I_1$, the overall maximum returned intensity value) of the maximum intensity peak 410. Further, the farthest lidar return outputted by the lidar sensor system 404 includes a second range value ($r_2$) and a second intensity value ($I_2$, the farthest local maximum returned intensity value) of the farthest range peak 412.

It is to be appreciated that the vapor 406 may be transparent or partially transparent in radar data outputted by a radar sensor system or a camera image outputted by a camera sensor system. For instance, the differing object 408 can be visible in radar data outputted by a radar sensor system at the location of the lidar sensor system 404 depicted in FIG. 4, while the vapor 406 may be transparent in the radar data. Likewise, the differing object 408 may be visible in a camera image outputted by a camera sensor system at the location of the lidar sensor system 404 shown in FIG. 4, while the vapor 406 may be transparent (or partially transparent) in the camera image. It is contemplated that haze due to the vapor 406 may be included in the camera image (or a portion thereof), for instance.

Figure 5:
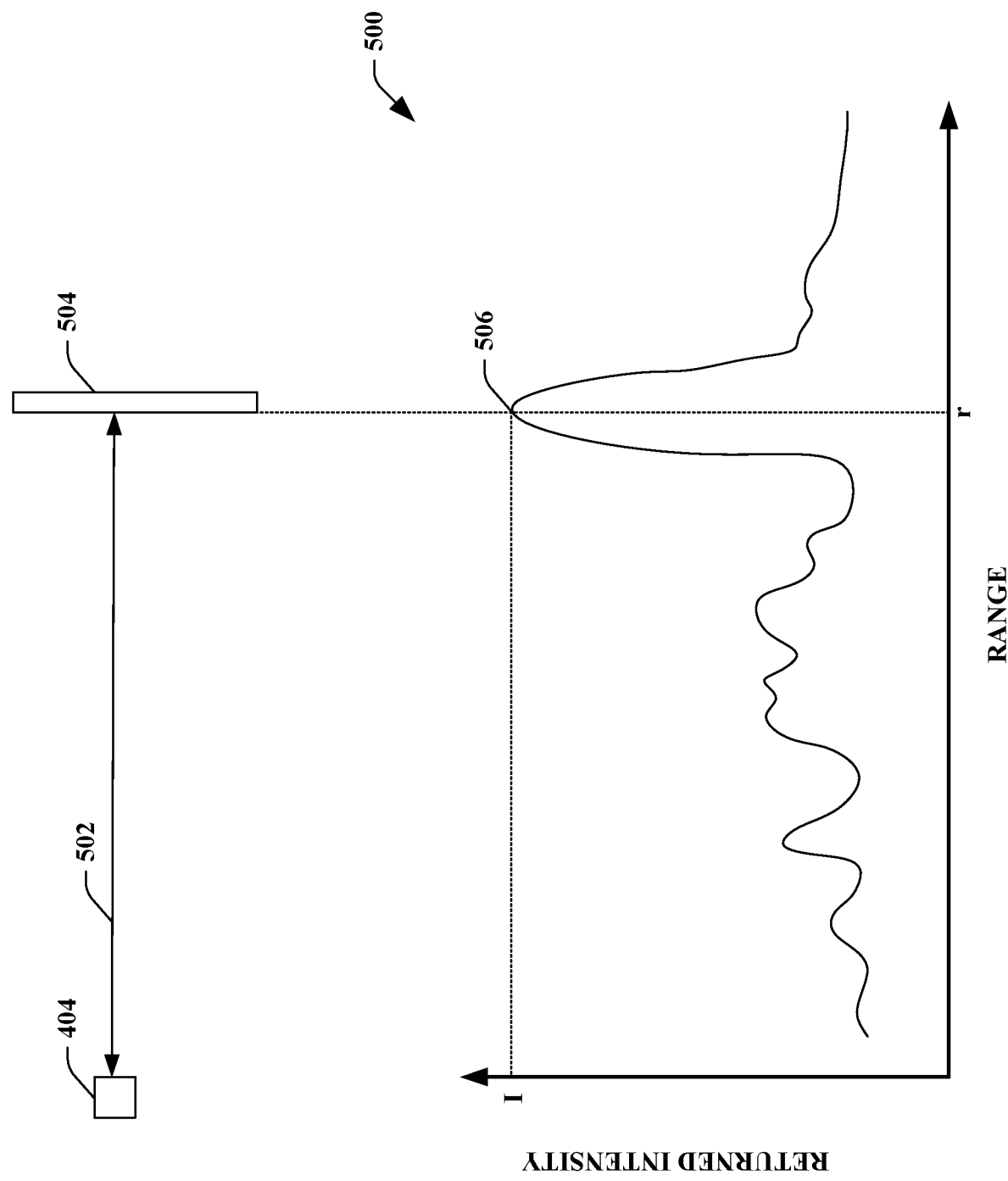
FIG. 5 illustrates another exemplary graph showing returned intensity of a reflected light beam versus range for a light beam emitted from the lidar sensor system.

With reference to FIG. 5, illustrated is another exemplary graph 500 showing returned intensity of a reflected light beam versus range for a light beam 502 emitted from the lidar sensor system 404 (e.g., the lidar sensor system 102). As shown in FIG. 5, the lidar sensor system 404 and an object 504 (e.g., the differing object 408) are positioned relative to each other such that vapor is not located there between. Thus, in contrast to the example of FIG. 4 where the light beam 402 is partially reflected by the vapor 406 and partially reflected by the differing object 408, the light beam 502 depicted in FIG. 5 is reflected by the object 504.

Reflection of the light beam 502 by the object 504 can cause the lidar sensor system 404 to detect a strongest lidar return at a peak 506. The reflection of the light beam 502 by the object 504 can also cause the lidar sensor system 404 to detect a farthest lidar return at the peak 506. Thus, the peak 506 can be both a maximum intensity peak and a farthest range peak. Further, the peak 506 can have a maximum returned intensity value I at a range value r. The range value r is a distance between the lidar sensor system 404 and a point on the object 504 that reflects the light beam 502. As shown in FIG. 5, there is no peak having a local maximum returned intensity value over a threshold value at a range greater than the range value r of the peak 506.

Again, as noted herein, the dual return lidar data outputted by the lidar sensor system 404 includes a strongest lidar return and a farthest lidar return received responsive to an emitted light beam. For the example of FIG. 5, the strongest lidar return outputted by the lidar sensor system 404 includes a first range value r and a first intensity value I of the peak 506. Likewise, the farthest lidar return outputted by the lidar sensor system 404 includes a second range value r and a second intensity value I of the peak 506. Thus, the same (or substantially similar) range and intensity values can be outputted as the strongest lidar return and the farthest lidar return of the dual return lidar data in the example set forth in FIG. 5.

Figure 6:
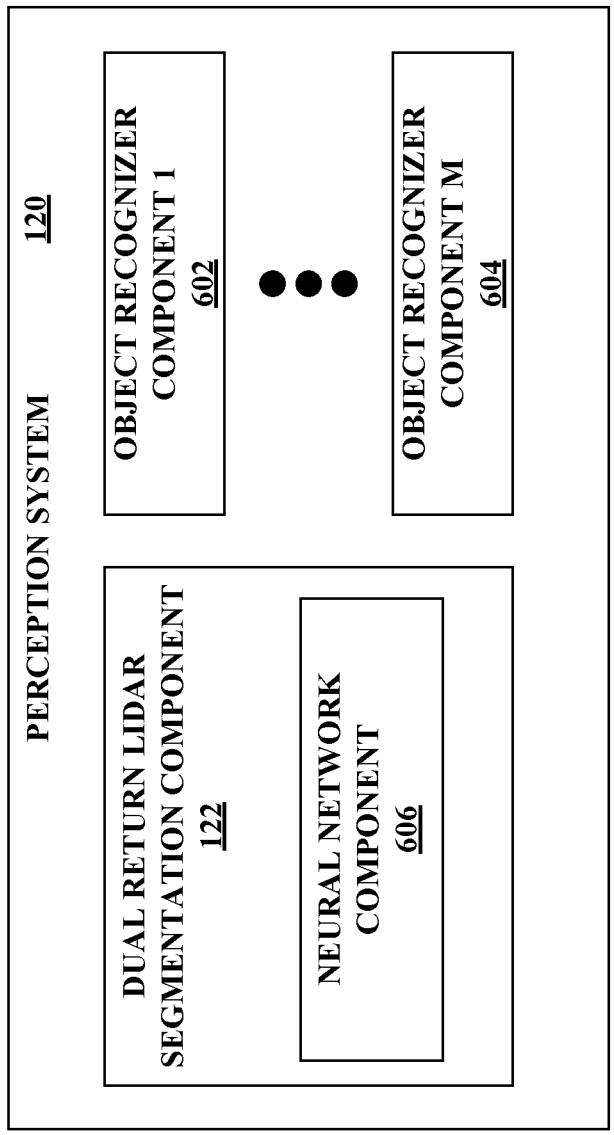
FIG. 6 illustrates a functional block diagram of an exemplary perception system of the autonomous vehicle.

Referring now to FIG. 6, an exemplary embodiment of the perception system 120 is shown. As depicted, the perception system 120 includes the dual return lidar segmentation component 122 and a plurality of additional object recognizer components, namely, an object recognizer component 1 602, . . . , and an object recognizer component M 604 (where M can be any integer greater than 1). The dual return lidar segmentation component 122 is configured to perform a per-point classification of points in the dual return lidar data (e.g., the lidar point cloud received by the perception system 120 from the lidar sensor system 104). Thus, the dual return lidar segmentation component 122 can classify each point (e.g., each strongest lidar return and/or each farthest lidar return) in the dual return lidar data as being a particular type of object from amongst a predefined set of types. The dual return lidar segmentation component 122 can output probabilities of a point respectively being each of the predefined types of objects. As described herein, the predefined types of objects include vapor. Moreover, the predefined types of objects can include, but are not limited to, vehicles, pedestrians, road surfaces, bikes, trees, and static objects.

Each of the additional object recognizer components 602-604 independently generates output based upon at least one sensor signal. For instance, the object recognizer component 1 602 can output data indicative of types of objects based upon camera images outputted by a camera sensor system, the object recognizer component M 604 can output data indicative of types of objects based upon radar signals, etc. The perception system 120 can be configured to assign labels to objects at locations in the driving environment based upon data outputted by the dual return lidar segmentation component 122 and the object recognizer components 602-604. Thus, for instance, the perception system 120 can be configured to determine which points in the dual return lidar data are representative of vapor based upon data outputted by the dual return lidar segmentation component 122 and the object recognizer components 602-604. Further, the perception system 120 can cause points in the dual return lidar data representative of vapor to be ignored in downstream processing. For example, the autonomous vehicle 100 can be controlled such that the autonomous vehicle 100 can travel through vapor in the driving environment (e.g., the autonomous vehicle 100 need not stop in advance of reaching a location at which vapor is detected, the autonomous vehicle 100 need not maneuver around vapor).

In the exemplary perception system 120 of FIG. 6, the dual return lidar segmentation component 122 includes a neural network component 606 (e.g., a neural network). The neural network component 606 is configured to receive a feature vector for each point overhead in the dual return lidar data (e.g., the lidar point cloud), and to output data that is indicative of probabilities of the point respectively being each of the predefined types of objects. The neural network component 606 can perform a multiclass classification of each point in the dual return lidar data to determine the probabilities of the point belong to each of the predefined object types.

The neural network component 606, for example, can be or include a deep neural network (DNN), a recurrent neural network (RNN), a convolution neural network (CNN), or the like. The neural network component 606 can include an input layer, one or more hidden layers, and an output layer. Each of the layers can include one or more nodes, and nodes of each layer can be connected to nodes in one or more other layers by way of edges. The edges and the nodes of the neural network component 606 can have weights assigned respectively thereto. Thus, each edge can be assigned a different weight (e.g., during a training procedure), and each node that is assigned a weight can be assigned its own weight. The neural network component 606 outputs the data indicative of the probabilities of the point respectively being each of the predefined types of objects based upon propagating the vector of the input features through the layers of the neural network component 606 to the output layer.

The feature vector that is inputted to the neural network component 606 can be generated by the dual return lidar segmentation component 122 based upon the dual return lidar data received by the perception system 120 from the lidar sensor system 102. The input features included in the feature vector can include the two lidar returns stacked on a channel dimension. According to an example, the feature vector can include an identifier of a light beam (x), an identifier of an azimuthal bin (y) (e.g., corresponding to the azimuthal angle of the light beam), a first range value of a strongest lidar return received responsive to the light beam at the azimuthal bin ($r_1$), a second range value of a farthest lidar return received responsive to the light beam at the azimuthal bin ($r_2$), a first intensity value of the strongest lidar return ($Intensity_1$) and a second intensity value of the farthest lidar return ($Intensity_2$). As noted above, the lidar sensor system 102 can include at least 64 light beams, at least 128 light beams, or at least 256 light beams; however, it is to be appreciated that other numbers of light beams are intended to fall within the scope of the hereto appended claims. Moreover, each of the light beams can be oriented as substantially any number of azimuthal angles (e.g., azimuthal bins) when scanning the driving environment of the autonomous vehicle 100.

As opposed to an approach that provides a feature vector that includes an identifier of a light beam, an identifier of an azimuthal bin, a single range value (e.g., of a strongest lidar return), and a single intensity value (e.g., of the strongest lidar return), the techniques set forth herein can utilize the dual return lidar data to enable identifying points corresponding to vapor in the dual return lidar data. Thus, for example, more information can be provided to the neural network component 606 using the techniques set forth herein as compared to other approaches, which enables identifying whether a lidar return (e.g., a strongest lidar return) is caused by reflection of a light beam by vapor.

Figure 7:
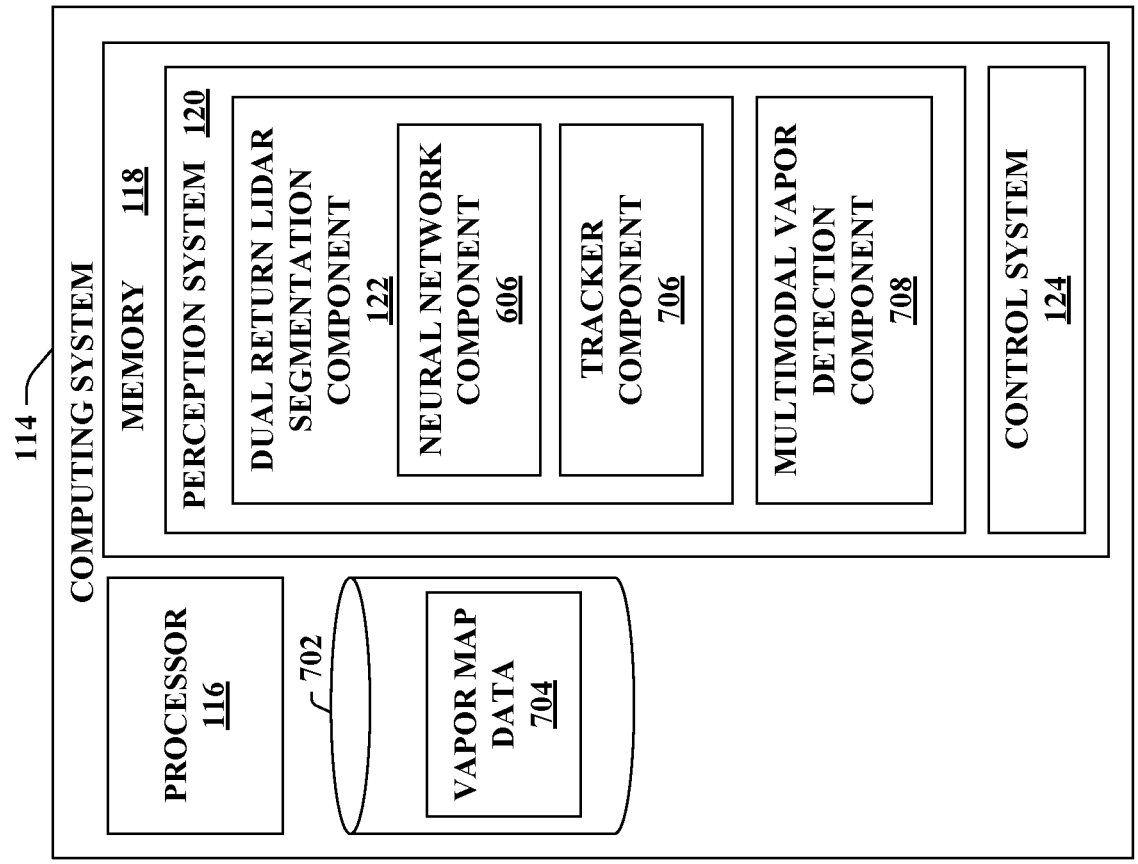
FIG. 7 illustrates a functional block diagram of an exemplary computing system of the autonomous vehicle.

Now turning to FIG. 7, illustrated is another exemplary embodiment of the computing system 114 (e.g., of the autonomous vehicle 100). Again, the computing system 114 includes the processor 116 and the memory 118. The memory 118 includes the perception system 120 and the control system 124, as noted above. The computing system 114 further includes a data store 702

According to various embodiments, the data store 702 can include vapor map data 704 indicating likely presence of vapor at geographic locations (e.g., prior information). The vapor map data 704 can include data indicating geographic locations at which vapor is often present. For example, certain geographic locations can often be foggy. Pursuant to another example, steam can often rise from certain vents on roads at particular geographic locations. In accordance with various embodiments, the vapor map data 704 can include data that specifies the geographic locations of steam vents, the geographic locations that are typically foggy (e.g., frequency of fog being above a threshold), a combination thereof, and so forth. Additionally or alternatively, the vapor map data 704 can include data specifying probabilities of vapor being at geographic locations (e.g., a probability of vapor being at a particular geographic location can be retrieved from the vapor map data 704).

As set forth herein, the perception system 120 can include the dual return lidar segmentation component 122. According to an example, the dual return lidar segmentation component 122 can modify probabilities of a point respectively being each of the predefined types of objects outputted by the neural network component 606 based on the vapor map data 704 indicating the likely presence of vapor at a particular geographic location. For instance, the vapor map data 704 can specify geographic locations that have steam vents or generally have a relative high probability of vapor (e.g., above a threshold); when a point is detected at one of these geographic locations, the vapor map data 704 can be used to modify the probabilities outputted by the neural network component 606 (e.g., increase a probability of a point being classified as vapor).

Pursuant to another example, the dual return lidar segmentation component 122 can utilize the vapor map data 704 as part of an input provided to the neural network component 606. For instance, the feature vector generated by the dual return lidar segmentation component 122 can further include the vector map data 704 indicating likely presence of vapor at a particular geographic location. According to an illustration, the vector map data 704 corresponding to the geographic location of the strongest lidar return can be included as part of the feature vector inputted to the neural network component 606. Following this illustration, the vector map data 704 corresponding to this geographic location can be included in the feature vector along with an identifier of the light beam, an identifier of the azimuthal angle of the light beam, a first range value of a strongest lidar return received responsive to the light beam at the azimuthal angle, a second range value of a farthest lidar return received responsive to the light beam at the azimuthal angle, a first intensity value of the strongest lidar return, and a second intensity value of the farthest lidar return.

Pursuant to various embodiments, the dual return lidar segmentation component 122 can further include a tracker component 706. The tracker component 706 can be configured to modify probabilities of a point respectively being each of the predefined types of objects outputted by the neural network component 606 based on data indicating likely presence of vapor emission from a tracked object in the driving environment of the autonomous vehicle 100. For instance, differing vehicle(s) within proximity of the autonomous vehicle 100 can be tracked, and orientations of such differing vehicle(s) can be identified. The tracker component 706 can identify location(s) of likely vapor emission by such differing vehicle(s). According to an illustration, exhaust can be nearby a backside of a differing vehicle. Thus, the tracker component 706 can modify the probabilities of a point nearby the backside of the differing vehicle; the tracker component 706 can increase a probability of the point being vapor near the exhaust location of the differing vehicle, which can lead to enhance performance of detecting vapor by employing contextual information provided by the tracker component 706.

Moreover, according to various embodiments, the perception system 120 can additionally or alternatively include a multimodal vapor detection component 708 configured to combine the dual return lidar data outputted by the lidar sensor system 102 with data outputted by one or more of the additional sensor systems 104-106 of the autonomous vehicle 100. The multimodal vapor detection component 708 can determine whether one or both of the lidar returns for a given point (e.g., a given beam and azimuthal bin) in the dual return lidar data corresponds to data outputted by one or more of the additional sensor systems 104-106. For example, the multimodal vapor detection component 708 can determine that the strongest lidar return for a given point does not correspond to the data outputted by a particular one of the additional sensor systems 104-106 and the farthest lidar return for the given point does correspond to such data, which can be indicative of the strongest lidar return for the given point being caused by vapor in the driving environment. Alternatively, the multimodal vapor detection component 708 can determine that the strongest lidar return for a particular point corresponds to the data outputted by the particular one of the additional sensor systems 104-106 (e.g., the farthest lidar return for the particular point may or may not correspond to such data), which can be indicative of the strongest lidar return for the particular point not being caused by vapor in the driving environment. Thus, the perception system 120 can be configured to assign the labels to the objects at the locations in the driving environment further based on an output generated by the multimodal vapor detection component 708.

The multimodal vapor detection component 708 can project the dual return lidar data outputted by the lidar sensor system 102 onto data outputted by a differing sensor system (e.g., a camera sensor system, a radar sensor system). The multimodal vapor detection component 708 can further determine whether one or both of the lidar returns as projected correspond to the data outputted by the differing sensor system. Moreover, the multimodal vapor detection component 708 can modify probabilities outputted by the dual return lidar segmentation component 122 (e.g., outputted by the neural network component 606) based on whether one or both of the lidar returns as projected correspond to the data outputted by the differing sensor system. Thus, the perception system 120 can assign a label to an object based on the probability as modified.

By way of illustration, the multimodal vapor detection component 708 can project the dual return lidar data outputted by the lidar sensor system 102 onto a camera image outputted by a camera sensor system. For a given point (e.g., a given beam and azimuthal bin) in the dual return lidar data, the multimodal vapor detection component 708 can identify whether the strongest lidar return and/or the farthest lidar return correspond to an object in the camera image on which the given point is projected. For instance, vision-based technique(s) can be implemented to detect a distance to the object in the camera image. The distance to the object detected from the camera image can be compared to a first range value of the strongest lidar return and a second range value of the farthest lidar return. For instance, a distance to a wall at a particular location shown in the camera image can be detected. The multimodal vapor detection component 708 can compare the distance to the wall at the particular location detected in the camera image to a first range value of a strongest lidar return and a second range value of a farthest lidar return corresponding to the particular location. Based on the comparison, if the multimodal vapor detect component 708 determines that the first range value of the strongest lidar return does not correspond to the distance to the object detected from the camera image and the second range value of the farthest lidar return does correspond to the distance to the object detected from the camera image, then the strongest lidar return can be identified as being caused by vapor in the driving environment (e.g., vapor between the autonomous vehicle 100 and the object can reflect a light beam emitted by the lidar sensor system 102 in the driving environment).

According to another example, the multimodal vapor detection component 708 can project the dual return lidar data outputted by the lidar sensor system 102 onto a camera image outputted by a camera sensor system. The multimodal vapor detection component 708 can further analyze the camera image to detect whether at least a portion of the camera image is hazy. Moreover, the multimodal vapor detection component 708 can modify probabilities outputted by the dual return lidar segmentation component 122 (e.g., outputted by the neural network component 606) based on whether the portion of the camera image is detected as being hazy. Thus, a region in the camera image classified as hazy can be utilized to modify the probabilities outputted by the dual return lidar segmentation component 122.

Moreover, while the output of the multimodal vapor detection component 708 is described in the above examples as being combined with the output of the dual return lidar segmentation component 122 (e.g., to modify the probabilities), it is contemplated that the output of the multimodal vapor detection component 708 can additionally or alternatively be used as an input to the neural network component 606.

Figure 8:
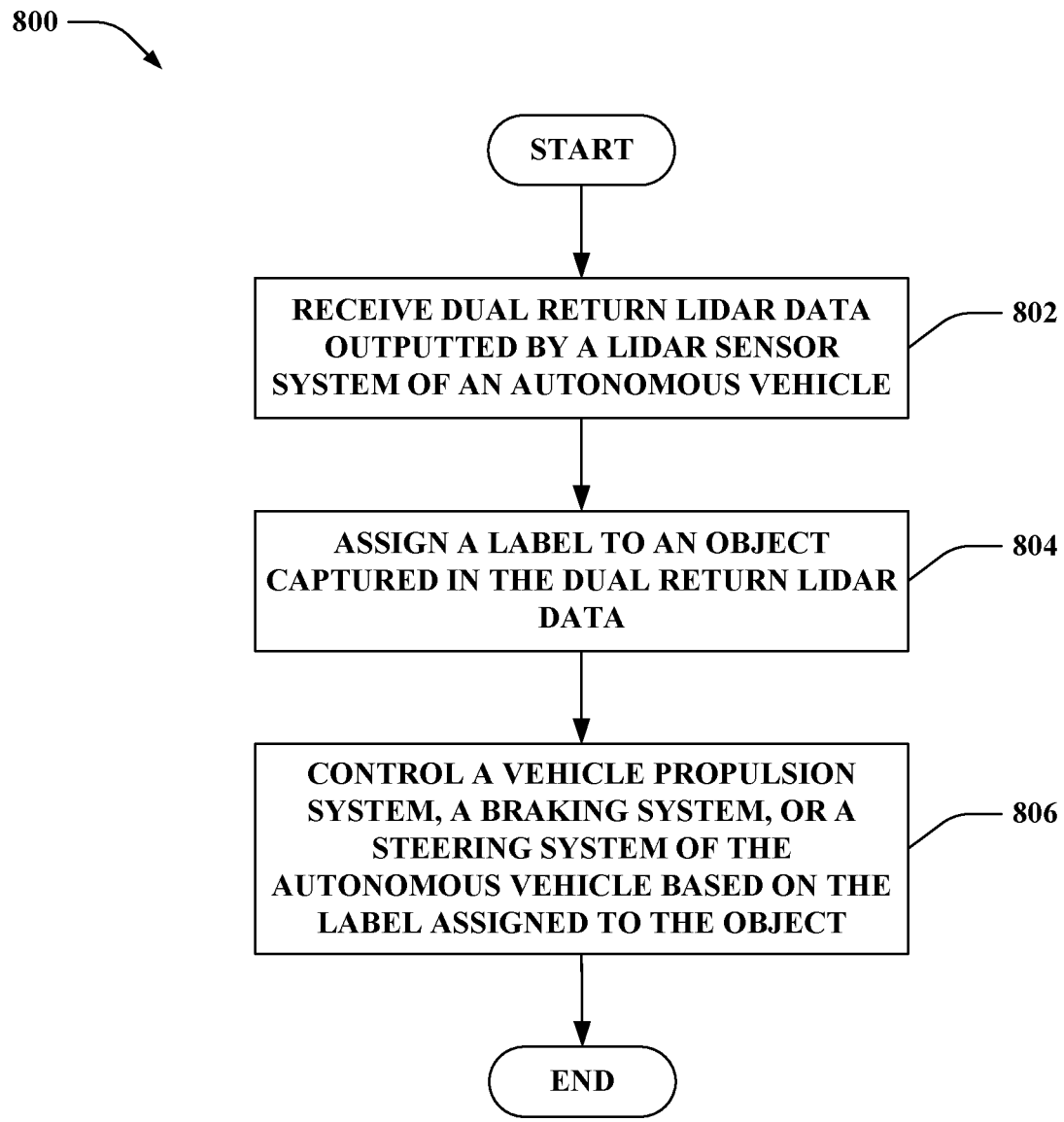
FIG. 8 is a flow diagram that illustrates an exemplary methodology of controlling an autonomous vehicle.

FIG. 8 illustrates an exemplary methodology relating to controlling an autonomous vehicle to detect data in a lidar point cloud representative of vapor and operate based on such detection. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning to FIG. 8, illustrated is a methodology 800 of controlling an autonomous vehicle. At 802, dual return lidar data outputted by a lidar sensor system of the autonomous vehicle can be received. The dual return lidar data can include two lidar returns detected responsive to a light beam emitted by the lidar sensor system into a driving environment of the autonomous vehicle. At 804, a label can be assigned to an object captured in the dual return lidar data. The label can identify a type of the object. The label can be assigned based upon a probability determined for the type of the object from amongst a predefined set of types. The predefined set of types includes vapor. Moreover, the probability can be determined for the type of the object based on the dual return lidar data. At 806, a vehicle propulsion system, a braking system, and/or a steering system of the autonomous vehicle can be controlled based on the label assigned to the object. The vehicle propulsion system, the braking system, and the steering system can be controlled such that the object is ignored when the object is assigned the label of vapor.

Figure 9:
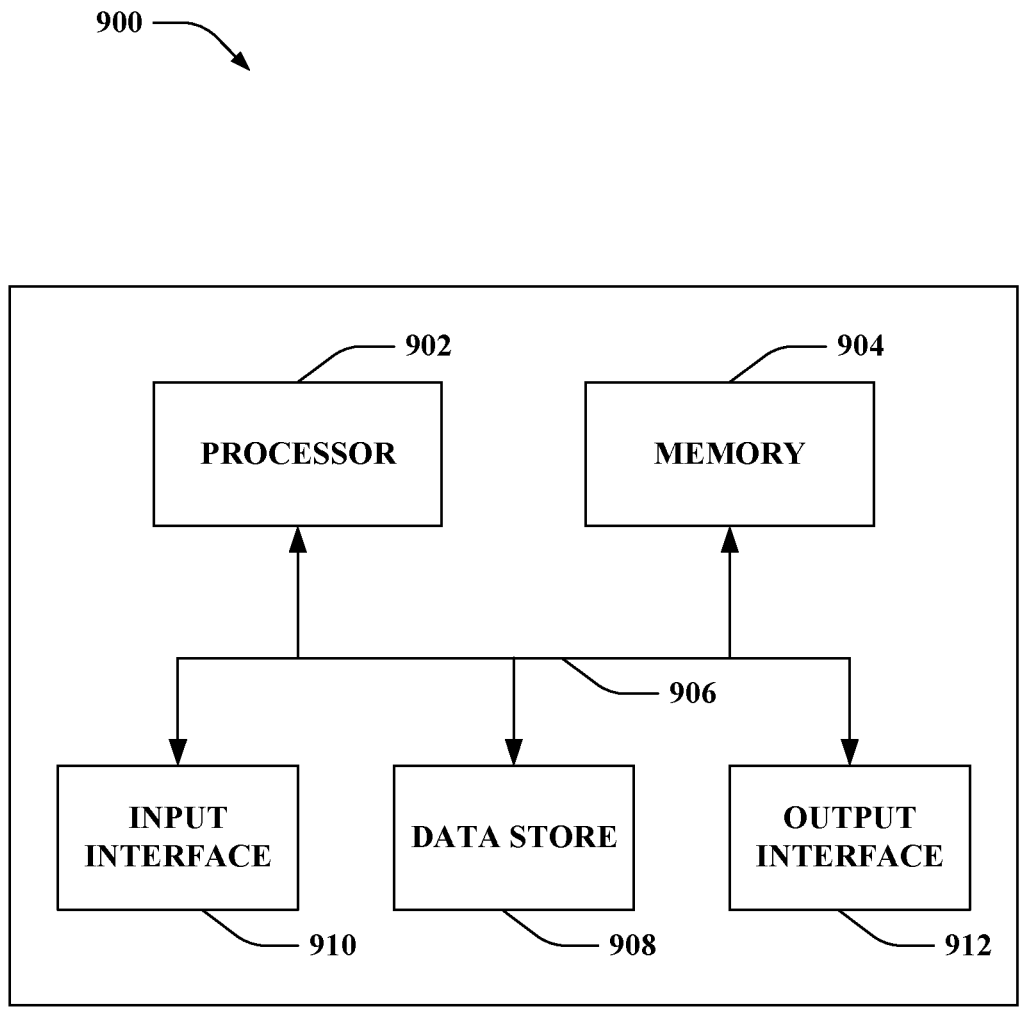
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be or include the computing system 114. The computing device 900 includes at least one processor 902 that executes instructions that are stored in a memory 904. The instructions may be, for instance, instructions for implementing functionality described as being carried out by one or more systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store lidar point clouds, labels assigned to points, vapor map data, and so forth.

The computing device 900 additionally includes a data store 908 that is accessible by the processor 902 by way of the system bus 906. The data store 908 may include executable instructions, lidar point clouds, labels assigned to points, vapor map data, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 108, the braking system 110, and/or the steering system 112 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a vehicle propulsion system;
   a braking system;
   a steering system;
   a lidar sensor system; and
   a computing system that is in communication with the vehicle propulsion system, the braking system, the steering system, and the lidar sensor system, wherein the computing system comprises:
   a processor; and
   memory that stores computer-executable instructions that, when executed by the processor, cause the processor to perform acts comprising:
   receiving dual return lidar data outputted by the lidar sensor system, the dual return lidar data comprising two lidar returns per channel detected responsive to a light beam emitted by the lidar sensor system into a driving environment of the autonomous vehicle;
   assigning a label to an object captured in the dual return lidar data comprising the two lidar returns per channel, wherein the label identifies a type of the object, wherein the label is assigned based upon a probability determined for the type of the object from amongst a predefined set of types, wherein the predefined set of types comprises vapor, wherein the probability is determined for the type of the object based on the dual return lidar data comprising the two lidar returns per channel, wherein the probability is determined for the type of the object being at a first range value corresponding to a strongest lidar return in the dual return lidar data, and wherein the probability is determined based on the first range value, a first intensity value of the strongest lidar return, a second range value corresponding to a farthest lidar return in the dual return lidar data, and a second intensity value of the farthest lidar return; and controlling at least one of the vehicle propulsion system, the braking system, or the steering system based on the label assigned to the object, wherein the vehicle propulsion system, the braking system, and the steering system are controlled such that the object is ignored when the object is assigned the label of vapor.

2. The autonomous vehicle of claim 1, wherein the two lidar returns per channel detected responsive to the light beam comprise:

the first range value and the first intensity value of the strongest lidar return received responsive to the light beam; and the second range value and the second intensity value of the farthest lidar return received responsive to the light beam.

3. The autonomous vehicle of claim 1, wherein the vapor comprises at least one of steam, fog, smoke, exhaust, or mist.

4. The autonomous vehicle of claim 1, wherein assigning the label to the object captured in the dual return lidar data further comprises:

determining the probability for the type of the object from amongst the predefined set of types.

5. The autonomous vehicle of claim 4, wherein determining the probability for the type of the object from amongst the predefined set of types further comprises:

generating a feature vector based upon the dual return lidar data, the feature vector comprises an identifier of the light beam, an identifier of an azimuthal angle of the light beam, the first range value of the strongest lidar return received responsive to the light beam at the azimuthal angle, the second range value of the farthest lidar return received responsive to the light beam at the azimuthal angle, the first intensity value of the strongest lidar return, and the second intensity value of the farthest lidar return; and inputting the feature vector to a neural network, wherein the probability for the type of the object is outputted by the neural network responsive to the feature vector being inputted to the neural network.

6. The autonomous vehicle of claim 5, wherein the feature vector further comprises vapor map data indicating likely presence of vapor at a particular geographic location.

7. The autonomous vehicle of claim 5, wherein determining the probability for the type of the object from amongst the predefined set of types further comprises:

modifying the probability for the type of the object outputted by the neural network based on vapor map data indicating likely presence of vapor at a particular geographic location.

8. The autonomous vehicle of claim 5, wherein determining the probability for the type of the object from amongst the predefined set of types further comprises:

modifying the probability for the type of the object outputted by the neural network based on data indicating likely presence of vapor emission from a tracked object.

9. The autonomous vehicle of claim 1, further comprising:

a differing sensor system, the differing sensor system being at least one of a camera sensor system or a radar sensor system;

wherein the acts further comprise:

projecting the dual return lidar data outputted by the lidar sensor system onto data outputted by the differing sensor system;

determining whether one or both of the lidar returns per channel as projected correspond to the data outputted by the differing sensor system; and modifying the probability for the type of the object based on whether one or both of the lidar returns per channel as projected correspond to the data outputted by the differing sensor system, wherein the label is assigned to the object based on the probability as modified.

10. The autonomous vehicle of claim 1, further comprising:

a camera sensor system;

wherein the acts further comprise:

projecting the dual return lidar data outputted by the lidar sensor system onto a camera image outputted by the camera sensor system;

analyzing the camera image to detect whether at least a portion of the camera image is hazy; and modifying the probability for the type of the object based on whether the portion of the camera image is detected as being hazy.

11. A method for controlling an autonomous vehicle, comprising:

receiving dual return lidar data outputted by a lidar sensor system of the autonomous vehicle, the dual return lidar data comprising two lidar returns per channel detected responsive to a light beam emitted by the lidar sensor system into a driving environment of the autonomous vehicle;

assigning a label to an object captured in the dual return lidar data comprising the two lidar returns per channel, wherein the label identifies a type of the object, wherein the label is assigned based upon a probability determined for the type of the object from amongst a predefined set of types, wherein the predefined set of types comprises vapor, wherein the probability is determined for the type of the object based on the dual return lidar data comprising the two lidar returns per channel, wherein the probability is determined for the type of the object being at a first range value corresponding to a strongest lidar return in the dual return lidar data, and wherein the probability is determined based on the first range value, a first intensity value of the strongest lidar return, a second range value corresponding to a farthest lidar return in the dual return lidar data, and a second intensity value of the farthest lidar return; and controlling at least one of a vehicle propulsion system, a braking system, or a steering system of the autonomous vehicle based on the label assigned to the object, wherein the vehicle propulsion system, the braking system, and the steering system are controlled such that the object is ignored when the object is assigned the label of vapor.

12. The method of claim 11, wherein assigning the label to the object captured in the dual return lidar data further comprises:
determining the probability for the type of the object from amongst the predefined set of types.

13. The method of claim 12, wherein determining the probability for the type of the object from amongst the predefined set of types further comprises:
generating a feature vector based upon the dual return lidar data, the feature vector comprises an identifier of the light beam, an identifier of an azimuthal angle of the light beam, the first range value of the strongest lidar return received responsive to the light beam at the azimuthal angle, the second range value of the farthest lidar return received responsive to the light beam at the azimuthal angle, the first intensity value of the strongest lidar return, and the second intensity value of the farthest lidar return; and
inputting the feature vector to a neural network, wherein the probability for the type of the object is outputted by the neural network responsive to the feature vector being inputted to the neural network.

14. The method of claim 13, wherein the feature vector further comprises vapor map data indicating likely presence of vapor at a particular geographic location.

15. The method of claim 13, wherein determining the probability for the type of the object from amongst the predefined set of types further comprises:
modifying the probability for the type of the object outputted by the neural network based on vapor map data indicating likely presence of vapor at a particular geographic location.

16. The method of claim 13, wherein determining the probability for the type of the object from amongst the predefined set of types further comprises:
modifying the probability for the type of the object outputted by the neural network based on data indicating likely presence of vapor emission from a tracked object.

17. The method of claim 11, further comprising:
projecting the dual return lidar data outputted by the lidar sensor system onto data outputted by a differing sensor system of the autonomous vehicle;
determining whether one or both of the lidar returns per channel as projected correspond to the data outputted by the differing sensor system; and
modifying the probability for the type of the object based on whether one or both of the lidar returns per channel as projected correspond to the data outputted by the differing sensor system, wherein the label is assigned to the object based on the probability as modified.

18. The method of claim 11, further comprising:
projecting the dual return lidar data outputted by the lidar sensor system onto a camera image outputted by a camera sensor system of the autonomous vehicle;
analyzing the camera image to detect whether at least a portion of the camera image is hazy; and
modifying the probability for the type of the object based on whether the portion of the camera image is detected as being hazy.

19. A method of for controlling an autonomous vehicle, comprising:
receiving dual return lidar data outputted by a lidar sensor system of the autonomous vehicle, the dual return lidar data comprising a first intensity value of a strongest lidar return and a second intensity value of a farthest lidar return per channel detected responsive to a light beam emitted by the lidar sensor system at a particular azimuthal angle into a driving environment of the autonomous vehicle, the dual return lidar data further comprising a first range value corresponding to the strongest lidar return and a second range value corresponding to the farthest lidar return;
determining probabilities for predefined object types based on the dual return lidar data, wherein the predefined object types comprise vapor, wherein a probability is determined for a type of an object being at the first range value, and wherein the probability is determined based on the first range value, the first intensity value of the strongest lidar return, the second range value, and the second intensity value of the farthest lidar return;
projecting the dual return lidar data outputted by the lidar sensor system onto data outputted by a differing sensor system of the autonomous vehicle;
determining whether at least one of the strongest lidar return or the farthest lidar return per channel as projected corresponds to the data outputted by the differing sensor system;
modifying the probabilities for the predefined object types based on the determination of whether at least one of the strongest lidar return or the farthest lidar return per channel as projected corresponds to the data outputted by the differing sensor system; and
controlling at least one of a vehicle propulsion system, a braking system, or a steering system of the autonomous vehicle based on the probabilities for the predefined object types as modified.

20. The method of claim 19, wherein determining probabilities for the predefined object types based on the dual return lidar data further comprises:
generating a feature vector based upon the dual return lidar data, the feature vector comprises an identifier of the light beam, an identifier of an azimuthal angle of the light beam, the first range value of the strongest lidar return, the second range value of the farthest lidar return, the first intensity value of the strongest lidar return, and the second intensity value of the farthest lidar return; and
inputting the feature vector to a neural network, wherein the probabilities for the predefined object types are outputted by the neural network responsive to the feature vector being inputted to the neural network.

* * * * *